A. Johnson,
Gearing.
No. 99,683. Patented Feb. 8. 1870.
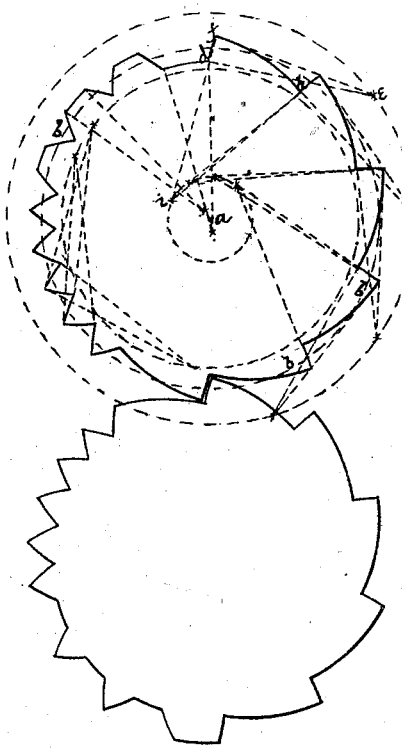
Witnesses
Harry King
C. L. Evert
Inventor.
Asa Johnson
per Alexander Mason
Attys.

United States Patent Office.

ASA JOHNSON, OF BROOKLYN, NEW YORK.

Letters Patent No. 99,683, dated February 8, 1870.

IMPROVED METHOD OF FORMING TEETH ON ROLLERS.

The Schedule referred to in these Letters Patent and making part of the same.

To all whom it may concern:

Be it known that I, ASA JOHNSON, of Brooklyn, in the county of Kings, and in the State of New York, have invented certain new and useful Improvements in Method of Forming Teeth or Corrugations on Rollers, Gear-Wheels, &c.; and do hereby declare that the following is a full, clear, and exact description thereof, reference being had to the accompanying drawings, and to the letters of reference marked thereon, making a part of this specification.

The nature of my invention consists in so forming the teeth or corrugations upon rollers, gear-wheels, &c., that are to mesh into each other, that they will roll smoothly and fit closely together at all points.

In order to enable others skilled in the art to which my invention appertains to make and use the same, I will now proceed to describe the manner in which the teeth or corrugations are formed, referring to the annexed drawings, which show my method of forming the same.

The rollers or wheels are grooved on their periphery, lengthwise, on a circle equal to a circle struck from the centre of the roller, to or around the roller or wheel, at one-half the depth of the teeth or moulding to be formed. After the compass has been set, same as to form the above circle, I put one of its points at one point or end of the tooth, projection, or moulding to be formed, and the other point of the compass far enough from the centre of the roller or wheel, so that when the first point, which is at the end of the tooth or moulding, is swung around, it will strike exactly at the other end of the tooth, segment, projection, or moulding, to be formed, making all the profile lines of said teeth on the same curve as the pitch-line of the roller.

In the drawing—

$a$ represents the centre of the roller, and $b\ b$ a circle drawn at one-half the depth of the teeth or corrugations to be formed, the radius of this circle being the pitch-line of the roller.

$d$ is the point where one point of the compass is placed, and $e$ the other, to form the side $d\ f$ of the tooth.

One point of the compass is then placed at the other end $h$ of the tooth, and the other point of the compass at $i$, to form the side $h\ f$ of the tooth.

In like manner, all the teeth are formed. It does not matter whether the sides of the teeth are long or short.

By this means of forming the teeth or corrugations, the rollers or wheels will run smoothly together, bearing as equally at all points as round rollers of the same size. They will not bind, and may be run one way as well as the other.

The advantage of this method of forming rollers, gear-wheels, &c., will be readily appreciated when it is remembered that the main difficulty has always been to get the teeth to fit properly without binding, and especially in rollers for corrugating sheet-metals, forming siding, and other mouldings, where one side of the projection is to be straight, and longer than the other; the difficulty has been to get the teeth or projections to bear equally at all points.

My rule of making the profile lines of such teeth or corrugations on the same curve as a circle having the pitch-line for a radius, is the only perfect rule, and the farther they are from this pitch-line, just in that proportion they are imperfect, and will not run smoothly, but bind more or less.

Having thus fully described my invention,

What I claim as new, and desire to secure by Letters Patent, is—

The method herein described of forming teeth or corrugations on rollers, gear-wheels, &c., substantially as set forth.

In testimony that I claim the foregoing, I have hereunto set my hand, this 20th day of January, 1870.

ASA JOHNSON.

Witnesses:
C. M. ALEXANDER,
J. M. MASON.